July 13, 1965  P. I. KLEIN  3,195,136
TIME AND DISTANCE OF CLOSEST APPROACH
DETECTOR OF MOVING OBJECT
Filed Sept. 20, 1962  4 Sheets-Sheet 3

INVENTOR.
Perry I. Klein

United States Patent Office 3,195,136
Patented July 13, 1965

3,195,136
TIME AND DISTANCE OF CLOSEST APPROACH
DETECTOR OF MOVING OBJECT
Perry I. Klein, Bethesda, Md. (Moore School of Electrical Engineering, University of Pennsylvania, Philadelphia, Pa.)
Filed Sept. 20, 1962, Ser. No. 224,996
6 Claims. (Cl. 343—112)

My invention relates to a system for electronically locating the point of inflection of a curve, embodying a simple method utilizing a Doppler analysis of signals received from a moving object.

The present invention overcomes the need for a stable and accurate frequency counter, a computer, or a desk calculator, which are expensive and complex; in addition, it overcomes the need for great mathematical computation required either by a computer program or by manual means.

The general object of this invention is to determine the exact time of maximum rate of change of a frequency which is changing as a function of time.

Another object of my invention is to determine the value of the maximum rate of change of frequency.

A still further object of my invention is to provide a simple method of automatic determination of time and distance of closest approach of a moving object.

Lastly, another object of my invention is to provide new and novel circuitry for use in navigation.

Figure 1:
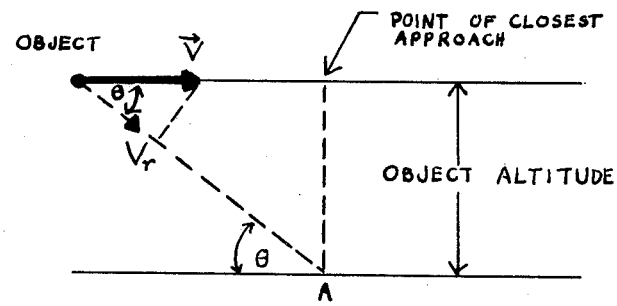
Figure 2:
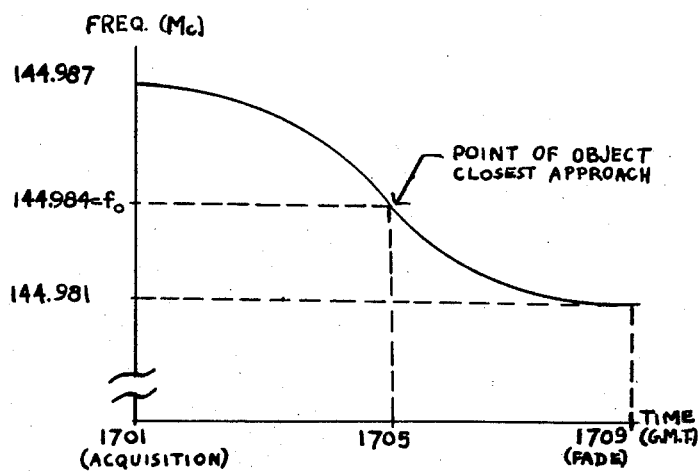
Figure 3:
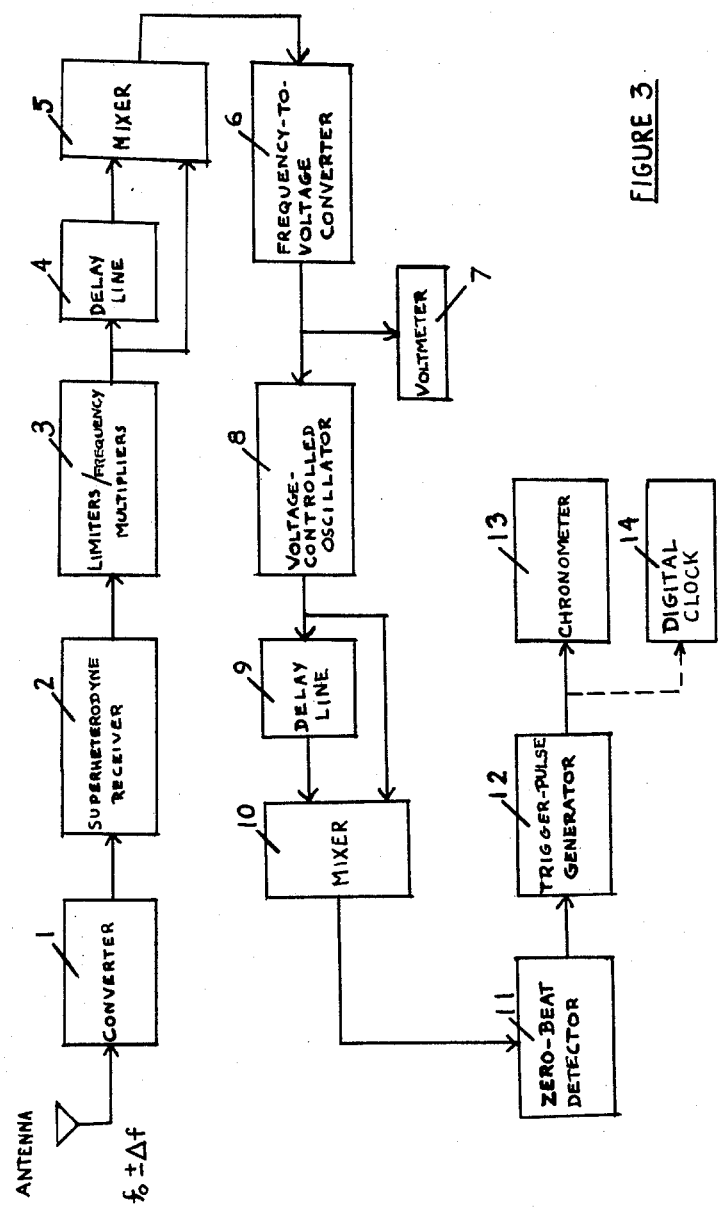
Figure 4A:
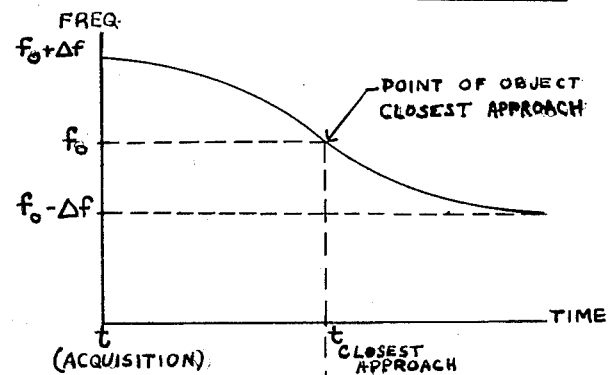
Figure 4B:
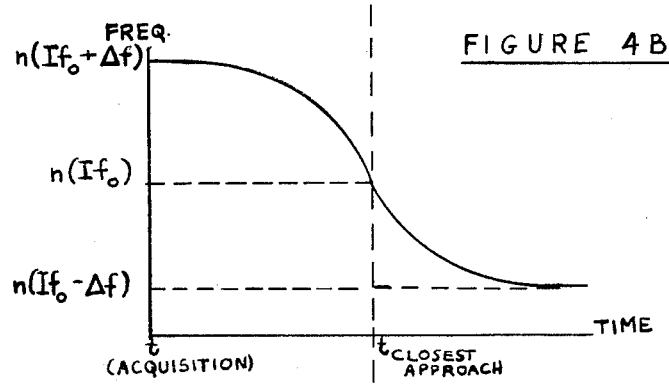
Figure 4C:
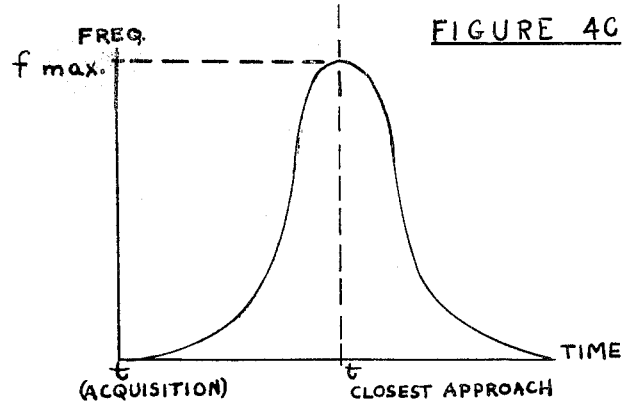
Figure 4D:
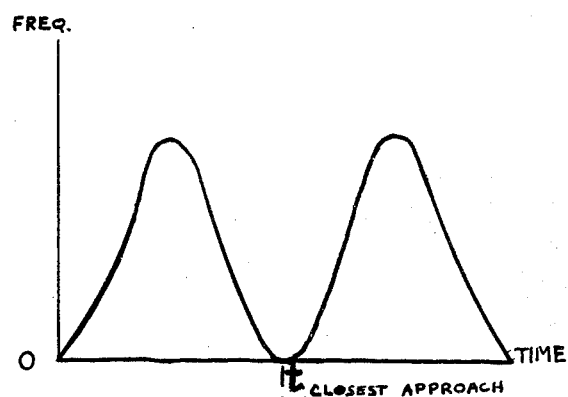
Figure 4E:
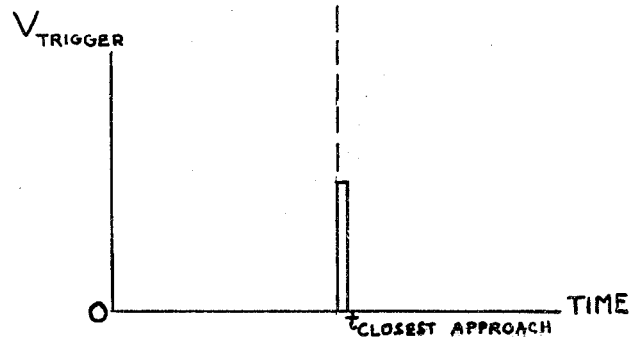

The novel features which I believe to be characteristic of my invention are set forth with particularity in the appended claims. My invention itself, however, both as to its organization and method of operation, together with further advantages thereof, may best be understood by reference to the following description taken in connection with the accompanying drawings wherein FIGURE 1 represents a diagram in which an object appears at an elevation angle $\theta$ to a receiving station at point A. FIGURE 2 represents a graph of received frequency with time for a typical object pass. FIGURE 3 shows in block diagram form an embodiment of my invention to a system performance operation of automatic determination of the time and distance of closest approach, utilizing the Doppler analysis. FIGURE 4A shows graphically the maximum Doppler shift. FIGURE 4B shows graphically the Doppler curve after frequency multiplication, applying a multiplication constant. FIGURES 4C and 4D show graphically the difference-frequency outputs of mixer 5 and mixer 10 respectively. FIGURE 4E shows graphically a trigger-pulse produced in trigger-pulse generator 12.

Referring to FIGURE 1, if an object travels at a velocity $v$, which is assumed reasonably constant for the duration of the pass within range of the receiving station at point A, the radial component of the object velocity with respect to the station at A is the only component of the velocity which contributes to the Doppler as received at station A. Thus the object velocity with respect to receiving station A is $v \cos \theta$. Substituting this into the Doppler equation, $f = fo(1 + v_r/c)$, we have $$f = fo(1 + v/c \cos \theta)$$

where $f$ is the received frequency, $fo$ is the transmitter frequency, $v$ is the object velocity, $\theta$ is the angle of elevation, and $c$ is the velocity of propagation of radio waves. As an object appears over the horizon, $\cos \theta$ approaches unity, and $f$ is maximum. As the elevation angle increases, the term $v/c \cos \theta$ decreases, and $f$ decreases. As the object passes overhead, the elevation angle approaches 90°, and $f = fo$. The elevation further changes to an obtuse angle, the cosine becomes negative, and $f$ becomes less than $fo$. As the object disappears over the horizon, $\cos \theta$ becomes $-1$, and $f$ reaches its minimum.

Note that at an elevation of 90° the object is at its closest point to the receiving station (neglecting earth rotation), and is moving perpendicular to the radial line from the receiving station to the object. At this point no Doppler occurs, and the receiving station hears the frequency of the transmitter. This point is also the point of inflection of the curve, i.e. the point at which the rate of change of frequency is a maximum.

This analysis can be extended to the general case, in which the object does not pass exactly overhead. In the general case a third component of the velocity enters into the Doppler equation, and the Doppler curve becomes less steep. From the point of inflection of the curve the time of closest approach is found. By determining the value of the slope at the time of closest approach, the distance of closest approach can be found. From this information the location of the receiving station can be determined, if the trajectory of the object is known. Conversely, if the locations of several tracking stations are known, closest approach information can be used to establish the trajectory of the object.

One method of determining the time of closest approach of a moving object is to find when $f = fo$. This method requires an extremely accurate and stable comparison oscillator at each receiving station, and a stable oscillator at the transmitter. The transmitter frequency ($fo$) must be measured from the ground with high precision, a difficult task if the transmitter is aboard the object and Doppler is present. The $fo$, in the case of a transmitter aboard a moving object, may not remain constant due to the effects of radiation and time on the transmitter and its power supply. Thus frequent measurements of $fo$ must be made, and comparison oscillators must be corrected for any changes in $fo$ if system accuracy is to be maintained. For an object traveling at a velocity of 5 miles/second, each millisecond error of time of closest approach results in approximately a 25-foot error in position of the object or the navigating station. For example, if a 250-foot position (10 millisecond) accuracy is desired, a maximum slope of 100 c.p.s./sec. at an $fo = 136$ mc. will require frequency accuracies and stabilities of better than one cycle at 136 mc., i.e. better than 7 parts in $10^9$. For slopes of less than 100 c.p.s./sec., even greater frequency accuracy and stability will be required. Such a technique is disadvantageous because of the high stability oscillators required.

A second method of determining the time of closest approach is to find the point of inflection of the Doppler curve. The technique generally used to accomplish this involves the measurement of a finite number of frequencies at regular intervals during the pass of the object. The Doppler curve is then reconstructed, either manually (such as in FIGURE 2) or by using a computer or desk calculator to best-fit a curve to these points. The accuracy of determination of point of inflection is basically limited by the closeness-of-fit of the curve, and the accuracy and speed of the frequency counter. For greatest accuracy, the frequency counter must count each frequency point in essentially zero time, since the frequency is changing as a function of time. This technique has the disadvantages of requiring stable and accurate frequency counters, expensive computers, or mathematical computation by manual means.

My system overcomes the difficulties inherent in the two methods by electronically differentiating the curve twice, on a real-time basis, and by reading-out the time at which the second derivative goes through zero. This can be done with great precision, since the method does not involve measurements of frequencies, but only sees the rate of change of frequencies with time. Thus no extremely stable oscillators and frequency counters are required. In addition, the system reads out the time and distance of closest approach with no manual computation required.

Referring to FIGURE 2, the Doppler curve for a typical object in motion, in this case an earth satellite, $fo$ represents the transmitted frequency. The point of closest approach is indicated thereon.

Referring to the system block diagram (FIGURE 3), converter 1 and superheterodyne receiver 2, are provided for converting the received signal to a very low intermediate frequency (IF). A "phase-lock" type of superheterodyne receiver can be used. The curve of FIGURE 4A, representing the input to converter 1, is thus transformed down to a center frequency of $If$. The amplified $If$ signal of the superheterodyne receiver 2 is then passed through several frequency multipliers 3, which also contain stages of amplitude-limiting to reduce amplitude variations. The effect of the frequency multiplication is to multiply the slopes along the Doppler curve by a multiplication constant, $n$, as shown in FIGURE 4B, which represents the output of the limiters/frequency multipliers 3. The bandwidth requirements of the frequency multipliers 3 increase as the order of multiplication. The system is designed to respond only to frequencies immediately adjacent to $fo$. This bandwidth limitation is advantageous to optimize signal-to-noise ratio, to minimize error due to propagation effects, and to reduce the dynamic range of amplitudes over which the receiver must operate. Part of the multiplied signal is sent through delay line 4, which delays the signal by a time interval, $h$. The delayed signal is mixed with the un-delayed portion of the signal, to produce a difference-frequency output at mixer 5. Thus $nIf(t)$ is mixed with $nIf(t-h)$ to produce the difference $nIf(t)-nIf(t-h)$. This difference frequency, when divided by $nh$, approaches the first derivative of the curve as $h$ is taken very small. If $h=1$ millisecond, the frequency at any instant is compared with the frequency that existed a millisecond before that instant. Thus the curve of FIGURE 4C is obtained at the output of mixer 5. The mixer output is passed through the frequency-to-voltage converter 6 which produces a D.C. voltage output that varies as its input frequency. This voltage is applied to a voltage-controlled oscillator 8, whose frequency thus changes as the first derivative of the original curve. The voltage-controlled oscillator output is then differentiated in a similar manner by mixing the output of the second delay line 9 (of time delay=$k$) with the un-delayed portion of the voltage-controlled oscillator output. The difference-frequency output of this second mixer 10 is sketched in FIGURE 4D. At the point of inflection of FIGURE 4A, the output frequency of the second mixer 10 goes through zero, and is detected in the zero-beat detector 11, which causes a trigger pulse to be produced in the trigger-pulse generator 12. FIGURE 4E represents the output of trigger-pulse generator 12. The trigger pulse is used to trigger a camera, photographing a reading at chronometer (read-out) 13. Alternatively, if a digital clock 14 is available, the trigger pulse is used to either stop the digital clock 14, or to photograph the digital clock reading. Other alternative means of reading-out the time can also be used. In addition, a voltmeter 7 is used for reading-out the value of the first derivative (from which the slope of the original curve can be determined at the instant of closest approach). This voltmeter 7 can also be photographed to read the slope at the instant of closest approach. The voltmeter can be calibrated to read either slope in c.p.s./sec. or to read distance directly. Alternative means can be used to read-out the frequency-output of mixer 5 or the voltage-output of frequency-to-voltage converter 6, to determine the slope.

Each component of the system will cause a time delay, particularly the frequency-to-voltage converter 6. The total time delay of the system, however, remains constant, and can be measured and applied as a correction to the read-out time. The synchronization of clocks at a navigating station can be a problem, since calibrating against a transmitted time standard, such as station WWV, involves finite signal propagation-time (of the order of 186 miles/millisecond). Signal propagation-time of the signal transmitted from the object must also be considered. This particular problem can be resolved by modulating the transmitter with time signals. Thus the propagation-time delay of the time signals is equal to the propagation-time delay of the Doppler information, and the effect can be neglected.

Conceptually, the time and distance detecting technique in locating the inflection point electronically can be advantageous in minimizing the effect of drift in the local oscillators of the system converter and receiver. Long-term frequency stability and accuracy are not important since this system examines only the rate of change of frequencies during a small time interval. If short-term frequency drift is essentially linear over the portion of the object pass which is within the system bandpass, no error in determination of time of closest approach will result, since the second derivative of the constant drift of frequency is zero. The determination of distance of closest approach, however, will be in error by the ratio of the rate of receiver drift to the maximum rate-of-change of Doppler frequency. The receiver drift can be measured after a pass of an object, by means of voltmeter 7, which will indicate rate of drift when a stable frequency transmission is received from another station. The measured drift can then be applied as a correction, if necessary.

Ionosphere refraction effects, multi-path, and other propagation effects may cause a false inflection in the Doppler curve. The use of high transmitted frequencies will reduce refraction effects, and the use of frequency diversity will also reduce these effects. Loss of signal (discontinuity) for a portion of the object pass will cause a zero output from the mixer 10 and thus will produce a trigger pulse. To prevent the false indication, the signal loss is checked in the receiver and used to stop the zero-beat detector and trigger-pulse generator. Similarly, any interference which could cause a false trigger is blanked out in the receiver, and thus is treated in the same manner as signal losses. Curve smoothing, particularly in the frequency-to-voltage converter, also helps to eliminate false indications from rapid inflections, by filtering the high-frequency components of the rapid fluctuations. Proper choice of $If$, $n$, $h$, and $k$ will minimize error and false indications.

Accordingly, this invention, with the techniques of finding the inflection point, the time and distance of closest approach of a moving object and receiver station, is electronically analyzed with the novel circuitry to achieve a simple and novel method. The following advantages are offered over the presently existing systems: (1) this invention does not require a stable and accurate high-frequency digital counter which is expensive and complex; (2) this invention does not require the use of a digital computer or desk calculator; (3) this invention does all computation automatically, reading out the answers (time and distance of closest approach information); (4) most important, this invention does not depend upon direct frequency measurement but only rate of change of frequencies. Thus ultra-stable oscillators are not required; (5) the effects of drift are minimized.

While I have shown only certain preferred embodiments of my invention by way of illustration, many modifications will occur to those skilled in the art, and I therefore wish to have it understood that I intend to cover, in the appended claims, such modifications as may fall within the true spirit and scope of my invention.

What is claimed is:

1. A system, comprising means for transmitting a predetermined frequency, means for receiving said frequency from a moving object, means for converting the received frequency to produce an intermediate frequency, means for amplitude limiting the amplified intermediate frequency, means for multiplying slopes along a Doppler curve through frequency multiplication, means for delaying the signal by a small time interval, means for mixing the un-delayed portion of the signal with the delayed portion to produce a difference-frequency output, means to produce a direct current voltage output that varies as said difference-frequency input from said means for mixing, oscillator means whose frequency is controlled by the voltage which changes as the first derivative of said curve, second delay means and second mixer means differentiating the voltage-controlled output by mixing the delayed and un-delayed portions of said voltage-controlled output, output of second mixer means causing a gate or trigger pulse produced by zero-beat detector means in combination with trigger-pulse generator means at the time of Doppler inflection, means for applying said gate or said trigger pulse to trigger said means for conversion of electrical pulses for accurate reading of time of Doppler inflection corresponding to time of object closest approach.

2. A system, comprising means for transmitting a predetermined frequency, means for receiving said frequency from a moving object, means for converting the received frequency to produce an intermediate frequency, means for amplitude limiting the amplified intermediate frequency, means for multiplying slopes along a Doppler curve through frequency multiplication, means for delaying the signal by a small time interval, means for mixing the un-delayed portion of the signal with the delayed portion to produce a difference-frequency output, means to produce a direct curret voltage output that varies as said difference-frequency input from said means for mixing, oscillator means whose frequency is controlled by the voltage which changes as the first derivative of said curve, second delay means and second mixer means differentiating the voltage-controlled output by mixing the delayed and the un-delayed portions of said voltage-controlled output, output of second mixer means causing a gate or trigger pulse produced by zero-beat detector means, in combination with trigger-pulse generator means at the time of Doppler inflection, means for applying said gate or said trigger pulse to trigger said means for conversion of electrical pulses for accurate reading of slope of Doppler curve at time of Doppler inflection corresponding to distance of object closest approach.

3. A system, comprising means for receiving a frequency which changes as a function of time, means for converting the signal to produce an intermediate frequency, means for amplitude limiting the amplified intermediate frequency, means for multiplying slopes along the received curve through frequency multiplication, means for delaying the signal by a small time interval, means for mixing the un-delayed portion of the signal with the delayed portion to obtain a frequency which varies as the first derivative of the original curve, means to produce a D.C. voltage output that varies as its input frequency, oscillator means whose frequency is controlled by the voltage which changes as the first derivative of said curve, second delay means and second mixer means differentiating the voltage-controlled output by mixing the delayed and un-delayed portions of said voltage-controlled output, output of second mixer means causing a gate or trigger pulse produced by zero-beat detector means in combination with trigger-pulse generator means at time of inflection, means for applying said gate or said trigger pulse to trigger said means for conversion of electrical pulses for accurate reading of time of inflection of said curve.

4. A system, comprising means for receiving a frequency which changes as a function of time, means for converting the signal to produce an intermediate frequency, means for amplitude limiting the amplified intermediate frequency, means for multiplying slopes along the received curve through frequency multiplication, means for delaying the signal by a small time interval, means for mixing the un-delayed portion of the signal with the delayed portion to obtain a frequency which varies as the first derivative of the original curve, means to produce a direct current voltage output that varies as said difference-frequency input from said means for mixing, oscillator means whose frequency is controlled by the voltage which changes as the first derivative of said curve, second delay means and second mixer means to produce a second derivative of the received frequency, output of second mixer means causing a gate or trigger pulse produced by zero-beat detector means in combination with trigger-pulse generator means at the time of inflection, means for applying said gate or trigger pulse to trigger said means for conversion of electrical pulses to read slope of said curve at time of inflection.

5. A system, comprising means for receiving a frequency which changes as a function of time, means for converting the signal to produce an intermediate frequency, means for multiplying slopes along the received curve through frequency multiplication, means for delaying the signal by a small time interval, means for mixing the un-delayed portion of the signal with the delayed portion to obtain a frequency which varies as the first derivative of the original curve, combination of means to read the slope of the original curve as a function of time.

6. A system, comprising means for transmitting a predetermined frequency, means for receiving said frequency from a moving object, means for converting the received frequency to produce an intermediate frequency, means for amplitude limiting the amplified intermediate frequency, means for multiplying slopes along a Doppler curve through frequency multiplication, means for delaying the signal by a small time interval, means for mixing the un-delayed portion of the signal with the delayed portion to produce a difference-frequency output, means to produce a direct current voltage output that varies as said difference-frequency input from said means for mixing, means for measuring said D.C. voltage output to obtain accurate reading of slope of the Doppler curve at time of Doppler inflection corresponding to distance of object closest approach, by calibration of said means.

References Cited by the Examiner

UNITED STATES PATENTS 3,089,029  5/63  Brinker _____ 343—8

CHESTER L. JUSTUS, *Primary Examiner.*